(12) United States Patent
Watanabe et al.

(10) Patent No.: US 6,816,334 B2
(45) Date of Patent: Nov. 9, 2004

(54) INFORMATION RECORDING AND REPRODUCING DEVICE AND TRACKING SERVO SYSTEM THEREFOR

(75) Inventors: Kosuke Watanabe, Tenri (JP); Kunio Kojima, Nabari (JP); Hiroyuki Katayama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 573 days.

(21) Appl. No.: 09/881,279

(22) Filed: Jun. 14, 2001

(65) Prior Publication Data

US 2001/0055176 A1 Dec. 27, 2001

(30) Foreign Application Priority Data

Jun. 14, 2000 (JP) ........................................ 2000-178648

(51) Int. Cl.[7] .............................................. G11B 5/596
(52) U.S. Cl. ................................................... 360/77.03
(58) Field of Search .............................. 360/75, 69, 26, 360/27, 51, 62, 135, 77.03; 369/13.02, 44.26, 275.3, 47.25, 44.29, 30.21, 275.1, 112.24

(56) References Cited

U.S. PATENT DOCUMENTS

| | | | | |
|---|---|---|---|---|
| 4,949,331 A | * | 8/1990 | Maeda et al. | 369/275.3 |
| 4,967,403 A | * | 10/1990 | Ogawa et al. | 369/44.26 |
| 5,084,860 A | * | 1/1992 | Maeda et al. | 369/275.3 |
| 5,182,734 A | * | 1/1993 | Watanabe et al. | 369/13.2 |
| 5,193,034 A | * | 3/1993 | Tsuyoshi et al. | 360/51 |
| 5,293,276 A | * | 3/1994 | Dunn et al. | 360/51 |
| 5,379,283 A | * | 1/1995 | Miyajima | 369/44.29 |
| 5,479,388 A | * | 12/1995 | Gondou et al. | 369/47.25 |
| 5,586,097 A | * | 12/1996 | Nishikawa | 369/112.24 |
| 5,666,345 A | * | 9/1997 | Takahashi et al. | 369/275.1 |
| 6,014,296 A | * | 1/2000 | Ichihara et al. | 360/135 |
| 6,144,627 A | * | 11/2000 | Muto | 269/30.21 |

FOREIGN PATENT DOCUMENTS

JP          01128276 A          5/1989

OTHER PUBLICATIONS

*Visual Information*, Media Journal, vol. 52, No. 10, pp. 1412–1415 (1998).

* cited by examiner

*Primary Examiner*—David Hudspeth
*Assistant Examiner*—Fred F. Tzeng
(74) *Attorney, Agent, or Firm*—David G. Conlin; Steven M. Jensen; Edwards & Angell, LLP

(57) ABSTRACT

An information recording and reproducing device includes a magnetic information detecting section for magnetically detecting magnetic information recorded at a given position on a recording medium, an optical information detecting section for optically detecting optical information recorded at a given position on each track of the recording medium, and a positional control section for controlling a position on the track using the detected magnetic information and optical information.

8 Claims, 5 Drawing Sheets

INFORMATION RECORDING AND REPRODUCING DEVICE AND TRACKING SERVO SYSTEM THEREFOR

CROSS-REFERENCE TO RELATED APPLICATION

This application is related to Japanese Patent Application No. 2000-178648 filed on Jun. 14, 2000, whose priority is claimed under 35 USC §119, the disclosure of which is incorporated by reference in its entirety.

BACKGROUND OF THE INVENTION

1. Field of the Invention

The present invention relates to an information recording and reproducing device, more particularly, an information recording and reproducing device suitable for a laser-assisted magnetic recording and reproducing system which is a high-density recording and reproducing system, a tracking servo system therefor and a recording medium therefor.

2. Description of Related Art

In an optical disk device and a magneto-optical disk device, in general, a continuous servo system using a guide groove or a sample servo system using a wobble pit as disclosed by Japanese Unexamined Patent Publication No. HEI 1(1989)-128276 has been used as a tracking servo system for determining the position of a head with respect to the disk.

By the continuous servo system, positional information on the optical disk is obtained by detecting a change in the amount of light diffracted by the guide groove with use of reflection of a light beam.

By the sample servo system using the wobble pit, pits for tracking are formed at regular intervals in a track direction, and positional information on the optical disk is obtained by detecting a change in the amount of light diffracted by the wobble pit with use of reflection of a light beam applied onto the optical disk like the continuous servo system.

In a magnetic disc device, since the distance between a magnetic head and a disk surface is only several tens of nanometers, the disk surface is required to be extremely flat and smooth. Therefore, desirably the disk surface is as free of surface treatment such as guide grooves or wobble pits as possible, which are adopted in the optical disk and the magneto-optical disk. For this reason, a special servo pattern for detecting relative positions of the head and tracks on the disk is generally recorded beforehand as magnetic information on the disk surface (see Visual Information Media Journal, Vol.52, No.10, pp.1412–1415(1998)).

The machining of the disk surface to provide unevenness, which has been applied for realizing the tracking servo in the optical disk and the magneto-optical disk may cause a recording/reproducing accuracy to deteriorate because variation in the shape and reflectance of the guide groove affects an error signal. In order to increase a track density, the guide groove needs to be formed with improved accuracy. However, in this case, there is a problem that the formation of the guide groove takes more time and more costs.

In a laser-assisted magnetic recording and reproducing system, which uses a laser beam as a heat source, a magnetic head is used in addition to an optical head. Therefore, like the conventional magnetic recording and reproducing system, extreme flatness and smoothness are required. It is desirable that the disk surface be not machined to have guide grooves or the like.

Further, in the laser-assisted magnetic recording and reproducing system, since a spot diameter of the laser beam is smaller than the length of the magnetic head in a track width direction, the width of a recording bit to be formed is determined by the spot diameter of the laser beam. Therefore, the accuracy of tracking needs to be determined on the basis of a light beam diameter.

However, in the currently available laser-assisted magnetic recording and reproducing system, there is not a tracking servo system in which both light beam diameter and magnetic signals are considered, and a highly accurate servo control cannot be performed.

SUMMARY OF THE INVENTION

The present invention has been made to provide an information recording and reproducing device which enables a highly accurate control of track position by detection of optical and magnetic information, and a tracking servo system for the device.

The present invention provides an information recording and reproducing device comprising: a magnetic information detecting section for magnetically detecting magnetic information recorded at a given position on a recording medium; an optical information detecting section for optically detecting optical information recorded at a given position on each track of the recording medium; and a positional control section for controlling a position on the track using the detected magnetic information and optical information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
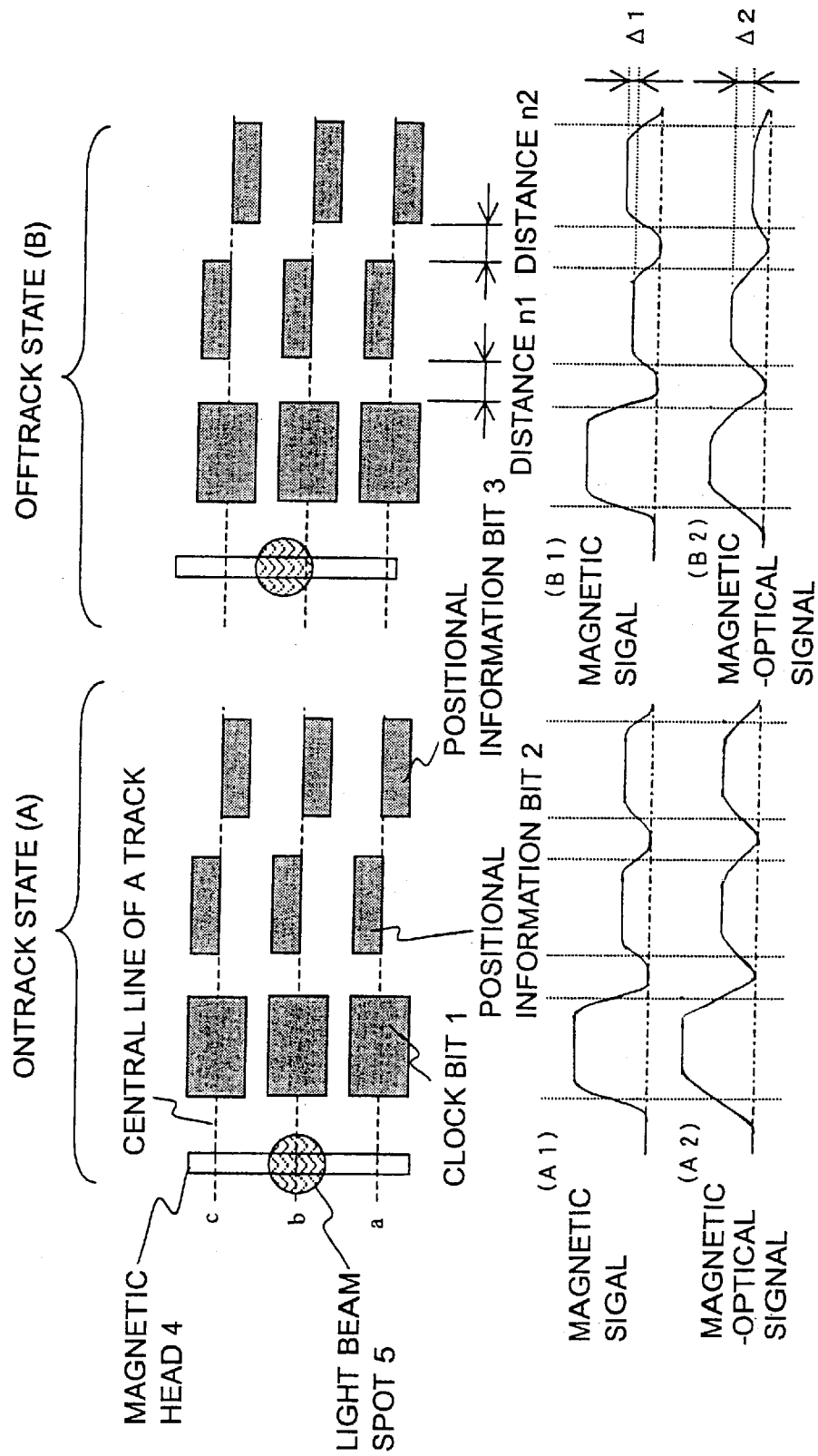
FIG. 1 is an explanatory view of a part of a surface structure of a recording medium in accordance with the present invention, illustrating a clock signal, a positional information signal and a positional relationship between a magnetic head and a light beam spot in an ontrack state and an offtrack state.

In the present invention, the magnetic information may be composed of one piece of clock information and the optical information may be composed of two pieces of positional information. These magnetic information and optical information may be magnetically recorded in the recording medium by use of a magnetic head. That is, the optical information is reproduced by an optical head but recorded by the magnetic head. On the other hand, the magnetic information is recorded and reproduced by the magnetic head.

Hereinafter, recorded information including the clock information and the positional information is referred to as a servo pattern.

Further, the information recording and reproducing device may comprise a clock generating section for generating a reference clock for recording and reproduction from the clock information and a comparison section for measuring signal intensities of the detected two pieces of positional information and comparing magnitudes of the signal intensities, wherein the optical information detecting section detects the two pieces of positional information on the basis of the reference clock and the positional control section controls the position on the track on the basis of a difference between the two signal intensities obtained by the comparison section.

Further, according to the present invention, the positional control section may provided with a drive section for driving the magnetic information detecting section and the optical information detecting section, and the drive section may control a relative position of the magnetic information detecting section and the optical information detecting section with respect to the recording medium so that the two signal intensities of the two pieces of positional information are the same.

Further, the present invention provides a tracking servo method for an information recording and reproducing device comprising: detecting predetermined magnetic information recorded at a given position on each track of a recording medium; detecting optical information recorded at a position on each track, the position having a given relative positional relation to the magnetic information; and controlling a position on the track using the detected magnetic information and optical information.

The magnetic information detecting section of the present invention corresponds to a magnetic head. The optical information detecting section is composed at least of a light source for applying a laser beam and a detector which receives the laser beam reflected by a disk, and corresponds to an optical head. As the laser beam, a violet laser with a wavelength of about 400 nm and the like may be used as well as a red laser with a wavelength of 650 nm as usually used.

The position control section is for controlling relative positions of the magnetic head and the optical head with respect to a track on a disk and may be composed of a microprocessor.

The recording medium of the present invention characteristically has a servo pattern including at least one piece of clock information and two pieces of positional information. The servo pattern is magnetically pre-stored in the recording medium. The servo pattern as magnetic information is read out by use of the magnetic head, the optical head and the light beam. Especially, the clock information of the servo pattern is read out by detection of leakage magnetic field with use of the magnetic head, and the positional information in the servo pattern is read out from a magneto-optical signal detected by a magnetic Kerr effect.

Examples of the present invention are now described with reference to the attached figures but should not be construed to limit the scope of the invention.

Figure 5:
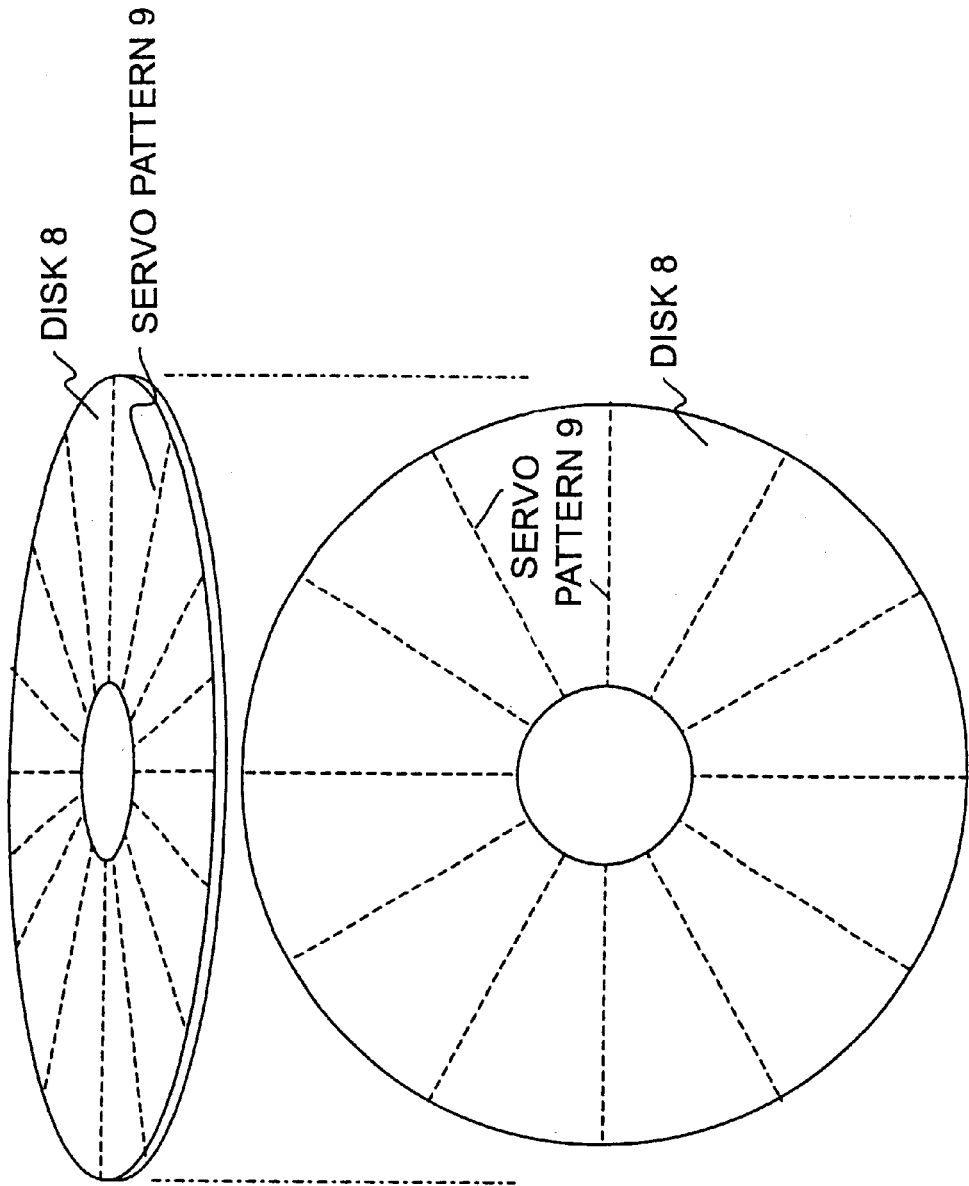
FIG. 5 is an explanatory view illustrating an arrangement of a servo pattern on a disk in accordance with the present invention.

FIG. 5 shows an example of the arrangement of the servo pattern of the recording medium used in the present invention.

A recording medium 8 (referred to as a disk hereinafter) is a multi-layered disk including a recording layer, a reflection layer and the like as currently used commonly, but is characterized in that servo patterns 9 are arranged to be recorded at regular angular intervals in directions crossing tracks running in a circumferential direction, i.e., radially from the center of the disk 8.

Figure 4:
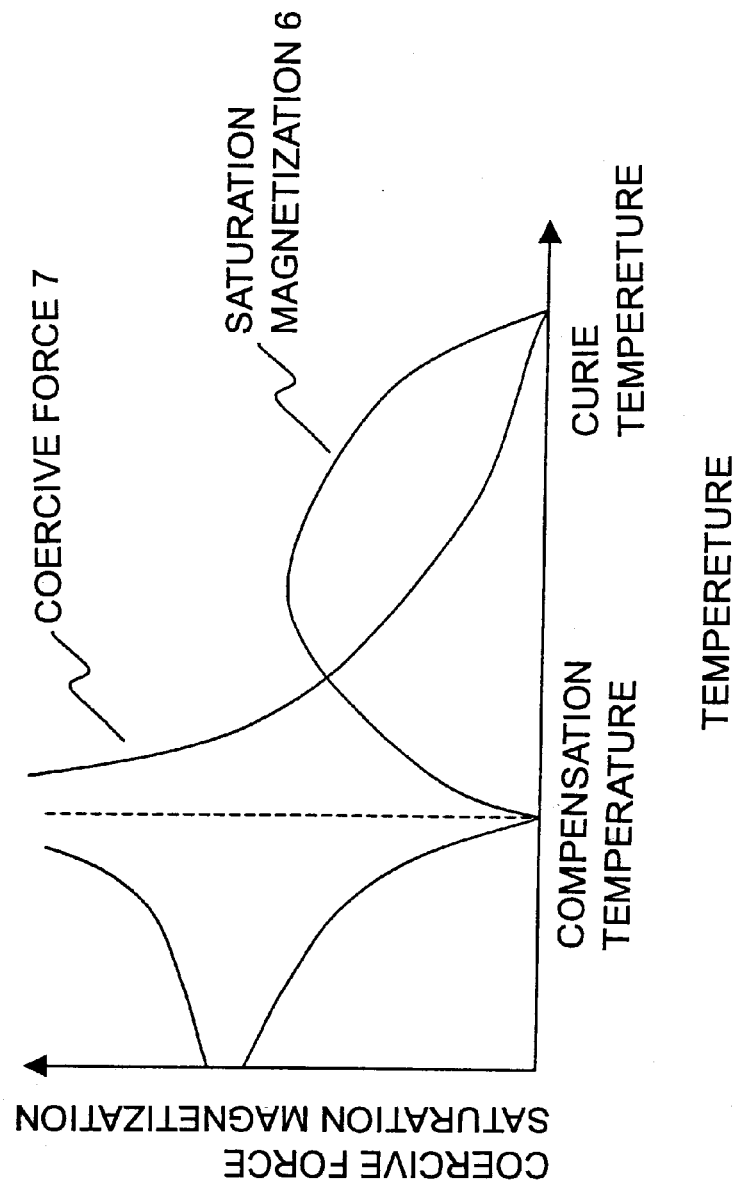
FIG. 4 is a graph representing temperature characteristics of coercive force and saturation magnetization of a medium used in the laser-assisted magnetic recording and reproducing system.

As the recording medium of this example, is used an N-type ferrimagnetic material made of a medium having temperature characteristics of saturation magnetization 6 and coercive force 7 shown in FIG. 4.

The information recording and reproducing device of the present invention is provided with a magnetic head for reading magnetic information on the disk and a light source for irradiating the disk with a laser beam.

The magnetic head and the light source may be disposed in opposed positions sandwiching the disk. Alternatively, the magnetic head and the light source may be adjacently disposed in the same direction with respect to the disk so that the laser beam is applied immediately under or near the magnetic head. That is, the magnetic head and the light source are so disposed that a thermal distribution for the laser-assisted magnetic recording and reproduction is generated in a region of the disk under the magnetic head.

Figure 2:
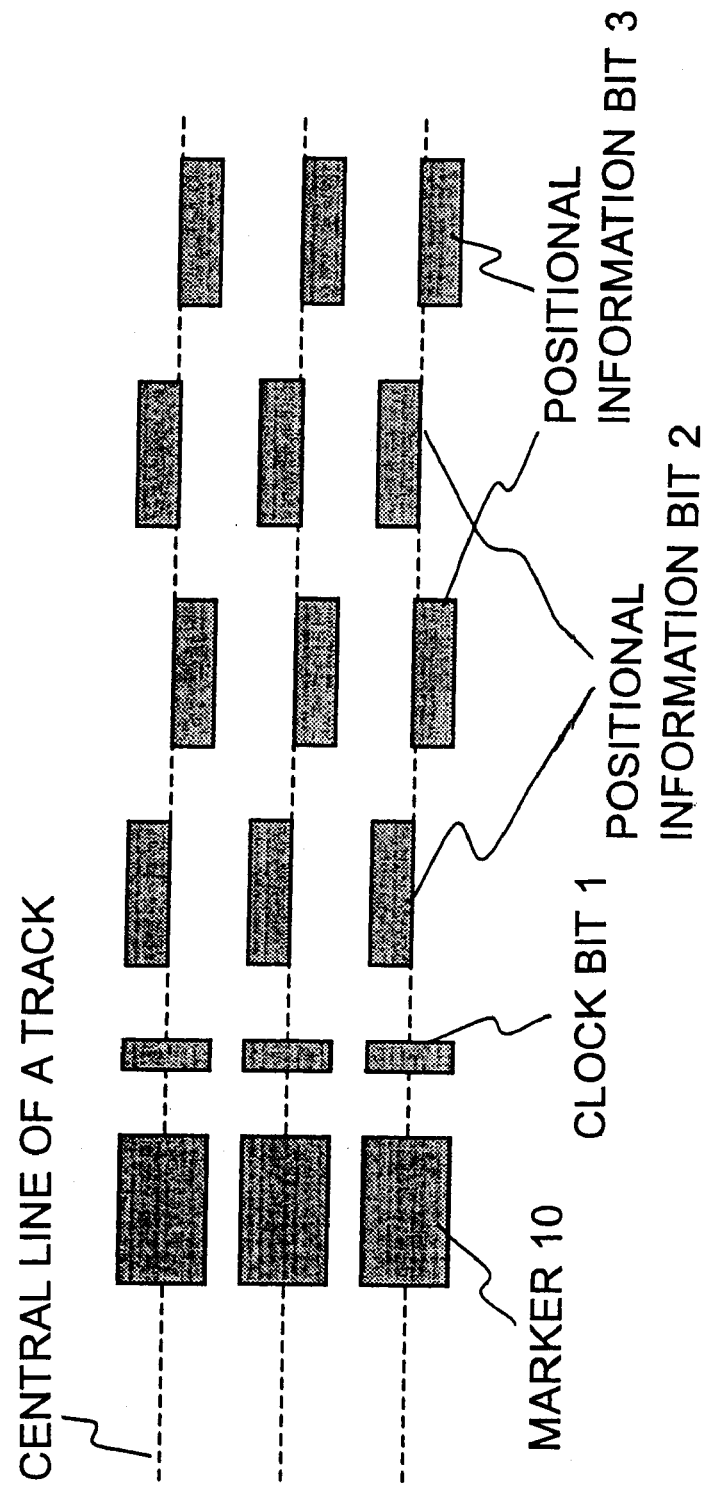
FIG. 2 is an explanatory view of a servo pattern composed of clock bits in combination with positional information bits.

FIG. 1 and FIG. 2 show explanatory views of parts of a surface structure of the recording medium of the present invention.

In FIG. 1, the servo pattern is shown to be a combination of one clock bit 1 and two positional information bits 2 and 3. In FIG. 2, the servo pattern is composed of a further combination with a marker 10 indicating the initiation of the servo pattern. However, the servo pattern is not limited to these illustrated patterns. For example, the number of the positional information bits may be increased to three or more for improving a tracking accuracy. Hereinafter, explanation is given of the disk having the servo pattern of FIG. 1.

In FIG. 1, three segments a, b and c are parts of three tracks on the disk. The operational principle of the tracking servo of the present invention is now explained with reference to FIG. 1.

The clock bit 1 of the servo pattern is recorded in the vicinity of the center of each track.

A distance n1 between the clock bit 1 and a first positional information bit 2 and a distance n2 between the first positional information bit 2 and a second positional information bit 3 are so set that an optical head does not detect magneto-optical signals from adjacent magnetic bits at the same time.

In other words, these distances are equal to or longer than a necessary minimum distance determined by a laser spot diameter and a signal processing performance. For example, if red laser with a wavelength of about 650 nm is used, the diameter of the light beam spot is about 1 $\mu$m and the necessary minimum for the distances n1 and n2 can be about 500 nm, which is about half the diameter.

The positional information bits 2 and 3 are recorded off the center of each track by about 0.2 $\mu$m upwardly and downwardly in FIGS. 1 and 2.

In FIG. 1, the left-hand view and the right-hand view show an ontrack state (A) and an offtrack state (B), respectively. That is, in the left-hand view, the light beam spot from the light source is on the central line of a track b, while, in the right-hand view, the light beam spot is a little off the central line of the track b.

In the ontrack state (A) of the left-hand view, the light beam spot is on the central line of the track b and the positional information bits 2 and 3 are located symmetrically above and below the central line of the track. Therefore, signals read from the two positional information bits 2 and 3 as optical information have the same intensity.

In other words, when the same intensity is detected from the two positional information bits, the light beam is on the central line of the track.

On the other hand, in the offtrack (B) of the right-hand view, the light beam spot is off the central line of the track b, and therefore, the intensity of a signal read from the positional information bit 2 is higher than the intensity of a signal read from the positional information bit 3.

In other words, when different intensities are detected from the two positional information bits, the light beam is not on the central line of the track and is upwardly or downwardly off the central line of the track.

The position of the light beam on the track can be controlled appropriately by adjusting the light beam so that the signals from the two positional information bits have the same intensity.

In the laser-assisted magnetic recording and reproducing system, a track width of the magnetic bit to be recorded is defined by the light beam spot diameter. If the intervals between the tracks are decreased closely to the light beam spot diameter, the magnetic head 4 extends over a plurality of tracks as shown in FIG. 1.

Thus, there is a problem that, in the case of using a medium whose magnetic compensation temperature is room temperature, at which the magnetization of the medium is zero and the coercive force thereof is infinite, crosstalk from adjacent tracks occurs and good reproduced signals cannot be obtained.

As a means for solving this problem, is proposed a crosstalk canceling method suitable for the laser-assisted magnetic recording and reproducing system (see "Crosstalk Canceling for Laser-Assisted Magnetic Reproduction" Oct. 8, 1999, the Applied Magnetics Society of Japan). This method may be used. In this method, the suppression of crosstalk from adjacent tracks is realized by using a ferrimagnetic material whose magnetic compensation temperature is higher than room temperature and utilizing its property of reversing the direction of the magnetization of the medium above and below the magnetic compensation temperature.

In FIG. 1, the magnetic head 4 is presumed to extend over three tracks. When the magnetic head 4 detects the clock signal and the positional information signals, crosstalk from adjacent tracks may take place. Referring to FIG. 1, tracking is presumed to be carried out on the track b.

Figure 3:
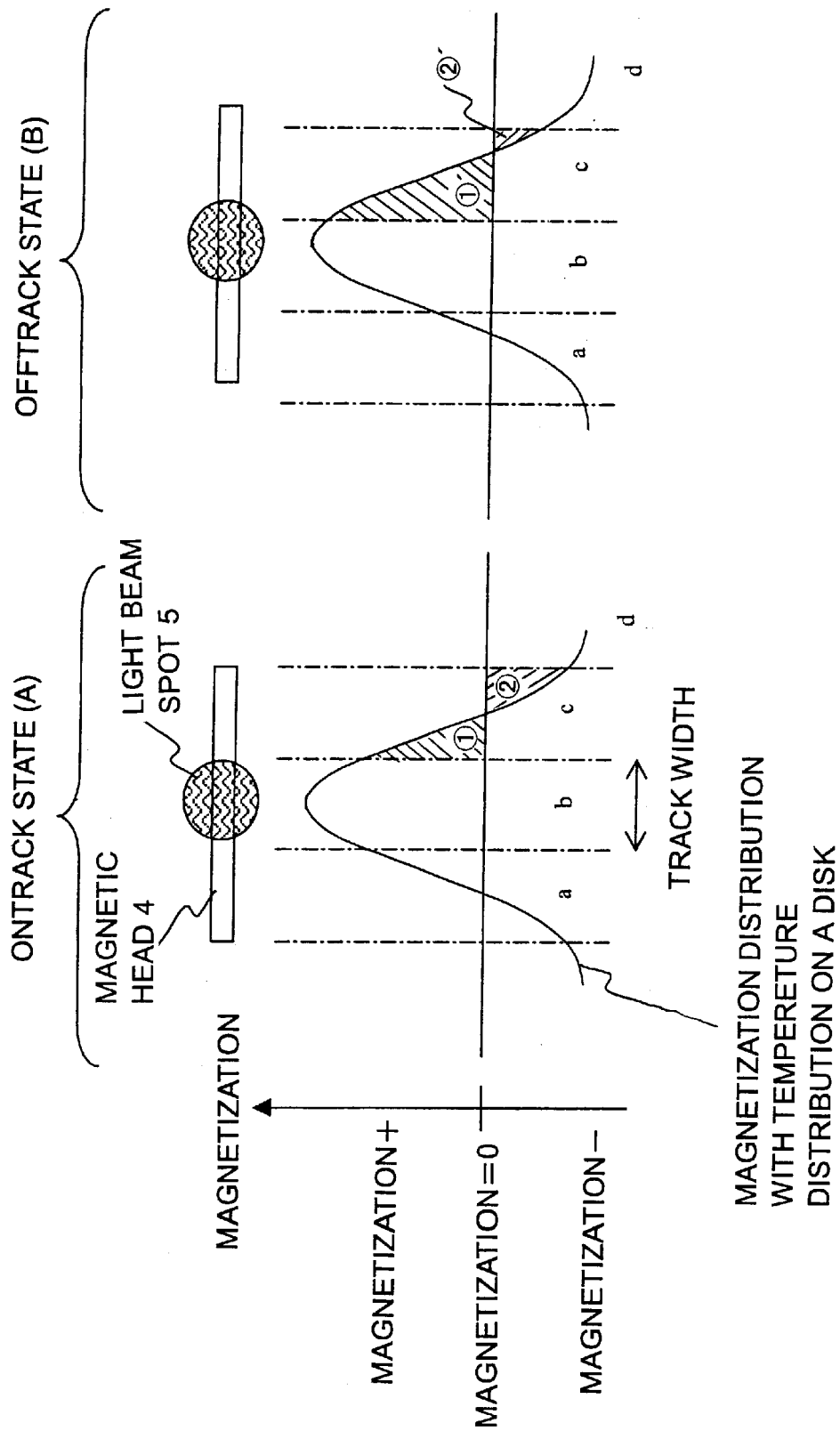
FIG. 3 shows graphs representing a relationship between the position of a light beam spot and the magnitude of magnetization in accordance with the present invention, illustrating crosstalk in the ontrack state and the offtrack state when a magnetic signal is used.

FIG. 3 shows graphs representing a relationship between the position of the light beam spot and the magnitude of magnetization.

First, in the ontrack state (A), are canceled signals read from the clock bit 1 recorded on the tracks a and c. This corresponds to the area of a region ① equaling the area of a region ② in FIG. 3. That is, the magnetization of the region ① has the same magnitude as and a polarity opposite to the magnetization of the region ②, and thereby, net magnetization of the track c becomes zero.

On the other hand, as regards positional information signals read from the positional information bits 2 and 3 which form a pair sandwiching the center of the track, they are not cancelled and an effect of crosstalk occurs even in the ontrack state.

However, as regards the positional information signals from the positional information bits 2, a positive signal and a negative signal are obtained from the track a and the track c, respectively, at the same intensity and are canceled. Thus, the signal from the track b alone is detected. Likewise, as regards the positional information signals from the positional information bits 3, the signal from the track b alone is detected at the same signal level. The waveform of the magnetic signal at this time is shown in A1 of FIG. 1.

Next, in the offtrack state (B), the temperature distribution in the medium shifts from the positions of the recorded signals. Thus, the clock signal is also affected by crosstalk from adjacent tracks. This corresponds to the offtrack state (B) shown in FIG. 3. Also the positional information signal is affected by crosstalk as it is affected in the ontrack state (A).

Considering the offtrack state (B) of FIG. 1 in correspondence with the offtrack state (B) of FIG. 3, both the clock signal and the positional information signal are detected as the total magnetization of tracks a, b, c and d. That is, the magnetic head 4 detects the total signals from the tracks over which the magnetic head 4 extends, and cannot extract a signal from the track b separately. Therefore, sensitivity to an offtrack decreases. An example of waveform of the magnetic signal at this time is shown in B1 of FIG. 1, where the signal level of the positional information bit 2 is smaller by $\Delta 1$ than the signal level of the positional information bit 3.

However, the clock signal, if it exceeds a certain magnitude, can be used as a reference clock. Therefore, even if clock signals from adjacent tracks mix therewith in the offtrack state (B), a stable reference clock can be obtained.

The clock signal is used for synchronization of sampling the positional information signal, and therefore, its accuracy in time is important. Since the length of the magnetic head 4 in the track direction (circumferential direction) is short, i.e., about one-third of the diameter of the light beam spot 5, a resolution of the magnetic head 4 is higher than that of the light beam spot 5. In other words, a readout signal by the magnetic head 4 has a shaper rising edge than the magneto-optical signal. Therefore, for detection of the clock signal, it is preferable to use magnetic head which exhibits higher accuracy in time.

As described above, even in the offtrack state, the use of the magnetic head is effective for the detection of the clock signal, for which it is sufficient to sense the presence of the signal. However, detection of the positional information signal by the magnetic head is of low reliability because it is necessary to observe a change in the magnitude of the positional information signal.

As a means for meeting this need, the signal from the positional information is detected as a magneto-optical signal by use of the light beam in this example.

In FIG. 1, the light beam spot diameter (1 μm) is close to the track width (0.6 μm). In both the ontrack state (A) and the offtrack state (B), the clock signals and the positional information signals from adjacent tracks are not detected, so that the effect of crosstalk is decreased.

First, in the ontrack state (A), magneto-optical positional information signals of the same intensity can be obtained from the positional information bits 2 and 3 because the positional information bits 2 and 3 pass through the respective halves of the light beam spot. The waveform of the magneto-optical signal at this time is shown in A2 of FIG. 1.

In the offtrack state (B), since the light beam shifts upwardly, the light beam spot 5 passes through a larger area of the positional information bit 2 than it passes through an area of the positional information bit 3. In proportion thereto, the magneto-optical signal from the positional information bit 2 has a higher intensity than that from the positional information bit 3. The waveform of the magneto-optical signal at this time is shown in B2 of FIG. 1. Thus, compared with the magnetic signal, a larger change ($\Delta 1$, $\Delta 2$) is obtained with the magneto-optical signal as corresponds to a change to offtrack.

Further, since the magneto-optical signal is less sensitive to a change in temperature than the leakage flux, the positional information can be stably obtained regardless of a temperature rise in the laser-assisted magnetic recording and reproducing system which performs recording and reproducing by raising the temperature of the recording medium. Thus, since the present invention provides a sample servo system in which the clock signal of the servo pattern is detected from the leakage flux and the positional information is detected as the magneto-optical signal, a good tracking servo can be realized.

However, the magnetic signal of the servo pattern may be erased by a large laser power in recording, a laser needs to be turned off or reduced on the servo pattern. At recording, the timing of turning on/off the laser for recording or the timing of raising/lowering the intensity of the laser for recording is controlled with reference to the clock signal obtained from the magnetic head.

According to the present invention, since the predetermined magnetic information is magnetically detected and the predetermined optical information is optically detected, a stable positional control in tracking can be realized without crosstalk, especially in the laser-assisted magnetic recording and reproducing system.

Also, the servo pattern including the clock information and a plurality of pieces of positional information is magnetically recorded on the recording medium, the clock information is magnetically detected and the positional information is optically detected. Accordingly, the tracking servo can be performed stably with good accuracy.

What is claimed is:

1. An information recording and reproducing device comprising:

a magnetic information detecting section for magnetically detecting magnetic information recorded at a given position on a recording medium;

an optical information detecting section for optically detecting optical information recorded at a given position on each track of the recording medium; and a positional control section for controlling a position on the track using the detected magnetic information and optical information.

2. The information recording and reproducing device according to claim 1, wherein the magnetic information comprises one piece of clock information and the optical information comprises at least two pieces of positional information.

3. The information recording and reproducing device according to claim 2 further comprising a clock generating section for generating a reference clock for recording and reproduction from the clock information and a comparison section for measuring signal intensities of the detected two pieces of positional information and comparing magnitudes of the signal intensities, wherein the optical information detecting section detects the two pieces of positional information on the basis of the reference clock and the positional control section controls the position on the track on the basis of a difference between the two signal intensities obtained by the comparison section.

4. The information recording and reproducing device according to claim 3, wherein the positional control section is provided with a drive section for driving the magnetic information detecting section and the optical information detecting section, and the drive section controls a relative position of the magnetic information detecting section and the optical information detecting section with respect to the recording medium so that the two signal intensities of the two pieces of positional information are the same.

5. A tracking servo method for an information recording and reproducing device comprising:

detecting predetermined magnetic information recorded at a given position on each track of a recording medium;

detecting optical information recorded at a position on each track, the position having a given relative positional relation to the magnetic information; and controlling a position on the track using the detected magnetic information and optical information.

6. The tracking servo method according to claim 5, wherein the magnetic information recorded on the recording medium comprises one piece of clock information, and the optical information recorded on the recording medium comprises at least two pieces of positional information.

7. A recording medium on which clock information to be reproduced as magnetic information and at least two pieces of optical information to be reproduced as optical information are magnetically recorded at a given position on each track.

8. The recording medium according to claim 7, wherein the length of the clock information in a direction orthogonal to the track is longer than the length of the positional information.

* * * * *